United States Patent
Minemura

[11] 3,730,609
[45] May 1, 1973

[54] THERMALLY COMPENSATED ULTRASONIC LIGHT MODULATOR

[75] Inventor: Kouichi Minemura, Tokyo, Japan

[73] Assignee: Nippon Electric Company, Limited, Tokyo, Japan

[22] Filed: Feb. 28, 1972

[21] Appl. No.: 229,814

[30] Foreign Application Priority Data

Mar. 10, 1971 Japan ..............................46/13212

[52] U.S. Cl.................................350/161, 332/7.51
[51] Int. Cl. ..............................G02f 1/28, H01s 3/00
[58] Field of Search ......................350/161; 332/7.51

[56] References Cited

UNITED STATES PATENTS 3,577,098    5/1971    Winston............................331/94.5 T Primary Examiner—Ronald L. Wibert
Assistant Examiner—V. P. McGraw
Attorney—Nichol M. Sandoe et al.

[57] ABSTRACT

An ultrasonic light modulator includes a transducer for generating an ultrasonic wave, a medium through which the wave generated by the transducer is propagated, an acoustooptical effect member attached to the medium, and a means for directing a light beam onto the member. The transducer, medium, and member are selected so that one has a temperature coefficient of resonant frequency different from the other two. The lengths of the transducer, medium, and member measured in the direction of the ultrasonic resonance are selected so that the overall temperature coefficient of the modulator is substantially zero.

2 Claims, 1 Drawing Figure 3,730,609
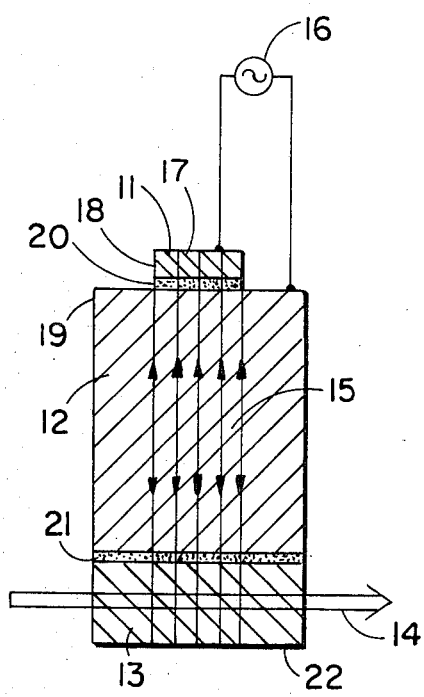

THERMALLY COMPENSATED ULTRASONIC LIGHT MODULATOR

BACKGROUND OF THE INVENTION

Modulation of light is very important to a variety of applications such as carrier light wave modulation, AM and/or FM mode locking for lasers, and Q switching for the generation of giant pulses. Several methods of effecting the light modulation have been proposed — that is: utilizing an electrooptical effect such as the Kerr effect or the Pockels effect; utilizing a magnetooptical effect such as the Faraday effect or the magnetic Kerr effect; and utilizing an acoustooptical effect such as the refraction or diffraction of light wave caused by ultrasonic waves. Of these methods, acoustooptic modulators utilizing light diffraction by ultrasonic waves have been found advantageous over the others in that both modulating power and insertion loss in the light paths can be reduced. This low power needed for modulation has rendered the acoustooptic modulators practical and advantageous compared with other types of modulators, particularly in longer wavelength region of the order of 10 6 microns where the other types of modulators tend to require appreciably larger modulating power.

When an ultrasonic wave passes through a substance, the refractive index of the substance is caused to vary by the acoustic pressure. Therefore, a light beam traversing the substance is subjected to change both in the direction of propagation and in phase. Light diffraction is an effect caused by the change in phase.

Supposing that the light beam incident upon the substance traverses the ultrasonic waves at substantially a right angle thereto and that the wavelength of the latter is smaller than the spot size of the beam, the ultrasonic density varies from point to point within the cross sectional areas of the beam — that is, a periodic pattern of layers of alternatively varying refractive index values is formed. This pattern functions as an ultrasonic phase grating, and diffraction of the light beam takes place.

In the diffraction caused by the stationary ultrasonic wave according to this invention, the intensity I of the zero order diffraction light is given approximately by:

$$I = 1 - v^2 + v^2 \cos 2wx \quad (1)$$

where $w$ stands for the angular frequency of the ultrasonic wave and $v$ is a parameter indicative of the phase grating that varies with position and time.

This equation indicates that light is amplitude-modulated with an angular frequency which is twice as high as the angular frequency of the ultrasonic wave.

On the other hand, the resonant frequency $f$ of an ultrasonic resonator is given by:

$$f = m(V/2L) \quad (2)$$

where V stands for velocity of the ultrasonic wave; L for the length of the ultrasonic resonator; and $m$ for an integer. Then, modulation can occur only within a particular frequency band centered at the ultrasonic resonant frequency and determined by the Q of the resonator. For example, experimental results obtained from an ultrasonic light modulator including an X-cut quartz transducer for generating a longitudinal wave at approximately 60 MHz and a medium of fused quartz, 25 mm in length, for propagation of the wave are as follows:

Resonant frequency spacing: Approx. 120 KHz
Bandwidth: Approx. 10 KHz

Details of this experiment are disclosed in a paper entitled "Internal Ultrasonic Light Modulators for Mode Locking" by N. Sekiguchi, compiled and published in "Proceedings of 1968 National Convention of the Institute of Electronics and Communication Engineers of Japan", vol. 4, pages 20 and 21.

As is indicated in the literature cited above, ultrasonic modulators of this kind have a practical difficulty in operation because of their temperature characteristics. Since both acoustic velocity V and length L of the ultrasonic modulator are subject to change with temperature, the resonant frequency $f$ changes with temperature as well. Therefore, assuming that the input modulating signal of the ultrasonic light modulator is a sinusoidal wave of a single frequency, modulation becomes impossible as changes in resonant frequency $f$ with temperature exceed the bandwidth of the modulator.

As has been described above the serious disadvantage of conventional ultrasonic light modulators is the large change of resonant frequency with temperature.

SUMMARY OF THE INVENTION

It is an object of this invention to provide an ultrasonic light modulator which is stable with respect to temperature changes and which does not require an auxiliary temperature control device.

The ultrasonic light modulator according to this invention includes a transducer means for generating an ultrasonic wave in response to an input modulating signal, a medium through which the ultrasonic wave is propagated, and a member having an ocoustooptical effect attached to the propagation medium. The temperature coefficients of the ultrasonic resonant frequencies of these members are so selected that the sign of at least one of the temperature coefficient is different from those of others and so that the over-all temperature coefficient of the resonant frequency of the ultrasonic light modulator may be made substantially zero by suitably proportioning the lengths of the transducer, medium and member measured in the direction of ultrasonic resonance.

BRIEF DESCRIPTION OF THE DRAWING

Additional aspects of this invention will be apparent from the accompanying drawing, which illustrates an ultrasonic modulator constructed in accordance with the invention, taken in conjunction with the detailed description below.

DESCRIPTION OF THE PREFERRED EMBODIMENT

The drawing shows a longitudinal cross section of an exemplary ultrasonic modulator constructed in accordance with this invention. It includes a transducer means 11 for generating an ultrasonic wave in response to an input signal; a medium 12 for the propagation of the ultrasonic wave; a member 13 which has an acoustooptical effect; a light beam 14 to be modulated; an ultrasonic wave 15 generated by the transducer 11; a modulating signal source 16 arranged to apply a modulating signal to the transducer 11; electrodes 17, 18 and 19 for applying a modulating electric field to the transducer 11; an optical adhesive 20 for attaching the transducer 11 to the ultrasonic propagation medium 12; and an optical adhesive 21 for bonding together the ultrasonic propagation medium 12 and the acoustooptical effect member 13.

The ultrasonic beam 15 generated by the transducer 11 passes through the ultrasonic propagation medium 12, enters the member 13 and then is reflected from the end surface 22 of the member 13 to travel back along its original path. An ultrasonic resonator is thus formed between the end surface 22 of the acoustooptical effect member 13 and the end surface of the electrode 17. These end surfaces 22 and 17 from the wave reflectors.

Since all the layers of the adhesives 20 and 21, and electrodes 17, 18 and 19 are extremely thin and since the effects of these members can be ignored, the resonant frequency $f$ of this resonator is given by:

$$(1/f)(2/1)[(L_1/V_1)+(L_2/V_2)+(L_3/V_3)] \quad (3)$$

where $L_1$ stands for the thickness of the transducer 11; $L_2$ the length of the medium 12; $L_3$ for the length of the medium 13; $V_1$ for the acoustic velocity in the transducer 11; $V_2$ for the velocity of the ultrasonic propagation travelling in the medium 12; $V_3$ for the acoustic velocity in the medium 13; and 1 is an integer.

From equation (3), the temperature coefficient of the resonant frequency $[(1/f)(df/dT)]$ is:

$$\left(\frac{1}{f}\frac{df}{dT}\right) = \frac{1}{\left(\frac{L_1}{V_1}+\frac{L_2}{V_2}+\frac{L_3}{V_3}\right)}\left\{\frac{L_1}{V_1}\left(\frac{1}{f_1}\frac{df_1}{dT}\right) + \frac{L_2}{V_2}\left(\frac{1}{f_2}\frac{df_2}{dT}\right)+\frac{L_3}{V_3}\left(\frac{1}{f_3}\frac{df_3}{dT}\right)\right\} \quad (4)$$

where $[(1/f_1)(df_1/dT)]$, $[(1/f_2)df_2/dT]$, and $[(1/f_3)(df_3/dT)]$ denote the temperature coefficients of resonant frequency of the transducer 11, the ultrasonic propagation medium 12, and the member 13 respectively. It is to be noted here that one temperature coefficient has a sign different from the other two.

Now, if the values of $L_1$, $L_2$, and $L_3$ are so chosen as to make the value within the brackets in the right-hand member of equation (4) zero, the overall temperature coefficient $[(1/f)(df/dT)]$ is zero.

Generally speaking, the transducer thickness $L_1$ is extremely small as compared to length $L_2$ of the ultrasonic propagation medium 12 or length $L_3$ of the member 13. Therefore, the influence of its temperature coefficient $[(1/f_1)(df_1/dT)]$ on the over-all temperature coefficient is extremely small.

Both the velocity and the wavelength of acoustic waves 15 propagated through the medium 12 and the member 13 change with temperature. The resonant frequency, however, is unaffected, because the over-all temperature coefficient is zero. For this reason the resonant frequency remains constant irrespective of the fact that the light beam 14 passes through the member 13 only.

Since the interactions between optical and ultrasonic waves occur in the member 13, this member should have a large acoustooptical effect to attain high modulation sensitivity. Optically isotropic materials are preferred to anisotropic materials for ease of directional adjustment. Furthermore, the use of materials of low optical losses is desirable. Optical properties as such, however, need not be given consideration for the medium 12, because no light passes therethrough.

An X-cut quartz transducer, X-cut quartz, and fused quartz can be employed respectively for transducer 11, the medium 12, and the member 13. The temperature coefficients for the element of $L_1 = 100$ microns and $L_2 = 50$ mm are:

$[(1/f_1)(df_1/dT)] = -20$ PPM/°C,
$[(1/f_2)(df_2/dT)] = -20$ PPM/°C, and
$[(1/f_3)(df_3/dT)] = 119$ PPM/°C. Since the velocities $V_1$, $V_2$, and $V_3$ are approximately equal to $570 \times 10^3$ cm/sec, $570 \times 10^3$ cm/sec, and $597 \times 10^3$ cm/sec, respectively, it is evident that the temperature coefficient $[(1/f)(df/dT)]$ can be made substantially zero for an element in which $L_3 = 8.8$ mm.

Conventional ultrasonic light modulators of this type have no ultrasonic propagation medium to compensate for the temperature coefficient and have a construction such that the transducer is attached directly to the acoustooptical effect member. Therefore, the temperature coefficient is governed by the acoustooptical effect member.

For this reason, as has been mentioned in the previously cited literature, temperature control of less than 0.5° C. accuracy is required when fused quartz is used as the acoustooptical effect member (because the temperature is 119 PPM/° C.). The modulator of this invention has proved effective to lower the temperature coefficient to −3 PPM/° C. within the operating temperature range of 0° to 50° C. by the use of an ultrasonic propagation medium such as X-cut quartz which is capable of compensating for the temperature coefficient. Experimental results indicate that the coefficient could be decreased to 1 PPM or less. As a practical matter, no temperature control is needed under ordinary operating conditions of ±25° C. for temperature coefficients of the order of 1 PPM/° C.

As is apparent from the foregoing, the modulator of the present invention is sufficiently stable with respect to temperature change. It should be noted that a practical ultrasonic light modulator of such excellent performance has been obtained by a simple structure using an ultrasonic propagation medium capable of compensating for the temperature coefficient.

In the embodiment described above, indium can be used for the electrodes 18 and 19. The adhesive 20 may be dispensed with if indium is employed as the electrodes, which are then thermocompressed. In other words the transducer 11 and the medium 12 may be bonded together by the indium thermocompression, without resorting to the use of an adhesive 20.

The known optical contact technique may be employed without using an adhesive 21 in bonding together the ultrasonic propagation medium 12 and the acoustooptical effect member 13.

It will be also obvious to those skilled in the art that the position of the medium 12 and 13 may be interchanged.

These and other variations of the invention will occur to those skilled in the art. The invention is not, therefore, limited to the exemplary embodiment described above. The scope of the invention is defined only by the appended claims.

I claim:

1. An ultrasonic light modulator comprising: a transducer means for generating an ultrasonic wave in response to an input signal; a medium through which the ultrasonic wave is propagated; an acoustooptical effect member attached to said medium so that the ultrasonic wave travels therethrough; and means for directing a light beam onto said acoustooptical effect member to subject the light beam to diffraction in response to the ultrasonic wave; wherein said transducer means, propagating medium, and acoustooptical effect member are selected so that the temperature coefficient of resonant frequency of one of them has a sign different from that of the other two; and wherein the lengths of said transducer means, propagating medium, and acoustooptical member measured in the direction of the ultrasonic resonance are selected in accordance with the velocity of said ultrasonic wave and the temperature coefficient of said transducer means, propagating medium, and acoustooptical effect member whereby the overall temperature coefficient of said transducer means, propagating medium, and acoustooptical effect member together is made substantially zero.

2. The ultrasonic light modulator of claim 1, wherein the said propagation medium is attached to said transducer means.

* * * * *